April 14, 1942.  E. H. WHITE  2,279,544
THERMOSTATIC CONTROL DEVICE
Filed Feb. 17, 1940
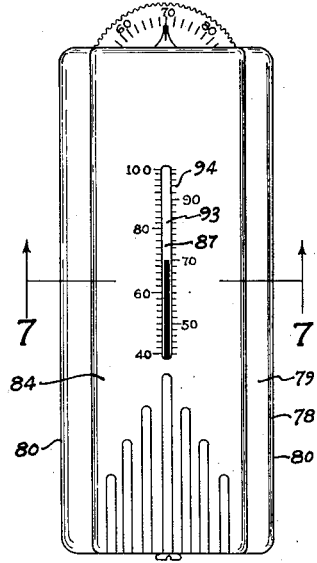
Fig. 1
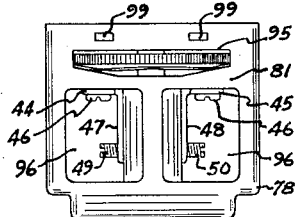
Fig. 2
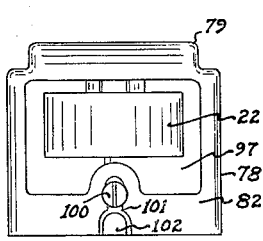
Fig. 3
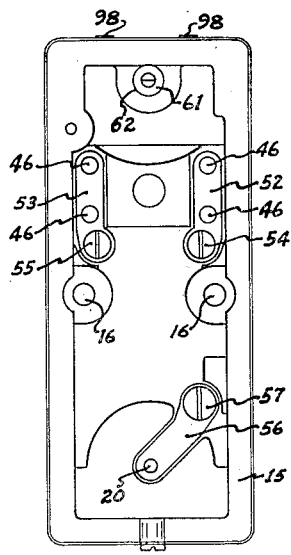
Fig. 4
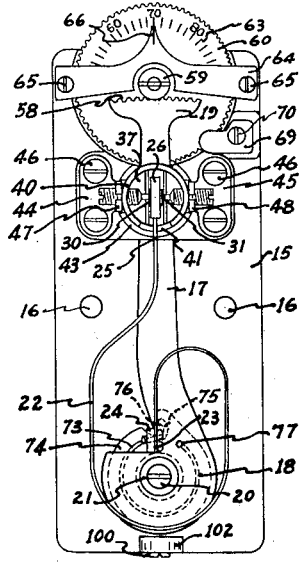
Fig. 5
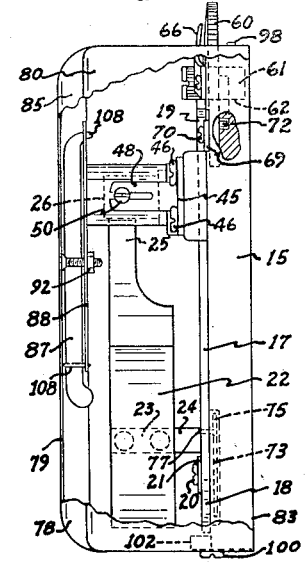
Fig. 6
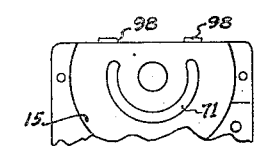
Fig. 8
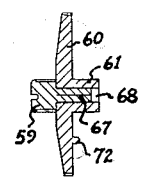
Fig. 9
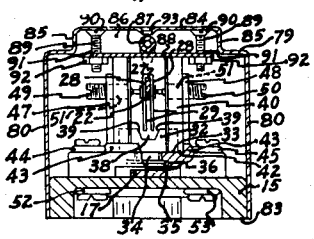
Fig. 7
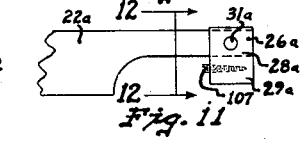
Fig. 11
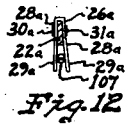
Fig. 12
Fig. 10
INVENTOR
EVERETT H. WHITE
BY G. H. Braddock
ATTORNEY Patented Apr. 14, 1942

2,279,544

UNITED STATES PATENT OFFICE 2,279,544

THERMOSTATIC CONTROL DEVICE

Everett H. White, St. Paul, Minn.

Application February 17, 1940, Serial No. 319,493

28 Claims. (Cl. 200—139)

This invention has relation to a thermostatic control device useful for a variety of purposes but designed to be more especially useful to the purpose of assisting or cooperating in the regulation of ordinary or preferred types of heating systems.

An object of the invention is to provide a thermostatic control device which will be of novel and improved construction.

A further object is to provide a thermostatic control device wherein will be incorporated various improved features and characteristics of construction novel both as individual entities of the thermostatic control device and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limited sense, changes in details of construction and arrangement of parts being permissible so long as within the spirit of the invention and the scope of the claims which follow.

In the accompanying drawing forming a part of this specification,

Fig. 1 is a front elevational view of a thermostatic control device made according to the invention;

Fig. 2. is a top plan view of the thermostatic control device;

Fig. 3 is a bottom plan view of said thermostatic control device;

Fig. 4 is a rear elevational view;

Fig. 5 is a front elevational view with the cover member removed;

Fig. 6 is a side elevational view, as seen from the right in Fig. 1, with parts broken away and other parts in section;

Fig. 7 is a transverse sectional view, taken substantially on line 7—7 in Fig. 1;

Fig. 8 is a fragmentary front elevational view of the base of the thermostatic control device;

Fig. 9 is a detail sectional view of the dial, and parts associated with said dial, of the thermostatic control device;

Fig. 10 is a more or less diagrammatic view of a modified form of thermostatic control device including features of the invention;

Fig. 11 is an elevational view of a fragment of a bi-metallic blade with a variant type of combined contact entity and armature thereon made according to the invention; and Fig. 12 is a detail sectional view, taken on line 12—12 in Fig. 11.

With respect to Figs. 1 to 9 of the drawing and the numerals of reference thereon, an insulating base for the thermostatic control device is denoted 15. Said insulating base 15 is constituted as a generally flat piece of rectilinear configuration, and includes openings 16 for the reception of any ordinary means, such as screws, for the purpose of mounting the insulating base upon a wall or other supporting member for the thermostatic control device.

A supporting and adjusting element or arm of said thermostatic control device is indicated 17. As disclosed, the element or arm 17 is of elongated, generally flat configuration, and includes a generally curvilinear end portion 18, an enlarged end portion 19, and an elongated body portion extending between said end portions. As disclosed, the curvilinear portion 18 is the lower end portion and the enlarged portion 19 is the upper end portion of said element or arm 17. Said curvilinear end portion 18 is disposed at the midwidth of the insulating base 15 near its lower end, said enlarged end portion 19 is disposed substantially at the midwith of said insulating base near its upper end, and the elongated body portion of the element or arm 17 is disposed substantially at the midwidth of the insulating base in contiguous relation to the adjacent surface of said insulating base.

The curvilinear end portion 18 of the supporting and adjusting element or arm 17 is oscillatably mounted upon the insulating base 15 in such manner that said element or arm 17, including its elongated body portion and its enlarged end portion 19, can be swung upon or over the adjacent surface of the insulating base 15 transversely of said insulating base. In the disclosure as made, means oscillatably mounting said curvilinear end portion 18 upon the insulating base 15 is constituted as a stud 20 which passes through the element or arm 17 as well as through said insulating base 15. A washer 21 upon the stud 20 and against the adjacent surface of the curvilinear end portion 18 of the element or arm 17 is adapted to retain said element or arm in contiguous, but slidable, relation to the adjacent surface of the insulating base 15.

A bi-metallic blade or thermostatically responsive member of the control device is represented 22. As disclosed, said blade or member 22 is of ordinary curved or looped configuration. It includes an end portion which is fixed, as at 23, to a lug 24 integral with and extending outwardly or forwardly from the curvilinear end portion 18 of the element or arm 17, and a free end portion 25 disposed substantially at the midwidth of the insulating base 15 and extending longitudinally of said insulating base. In the illustrated embodiment of the invention, the blade or member 22 is in spaced relation to the insulating base 15, at the front of said insulating base, and the free end portion 25 of said blade or member 22 fixedly supports a combined contact entity and armature, denoted generally at 26, which is situated substantially at the midwidth of the insulating base 15 in spaced relation thereto, between the upper and lower end portions of the element or arm 17, and considerably closer to the enlarged upper end portion 19 than to the curvilinear lower end portion 18 of said element or arm 17. The combined contact entity and armature 26 is disposed longitudinally of the insulating base 15.

More explicitly, said combined contact entity and armature 26 includes, as disclosed, a strip of metal bent or folded upon itself, as at 27, and having legs 28 of the strip at either side of and contiguous with the opposite side surfaces of the free end portion 25 of the bi-metallic blade or thermostatically responsive member 22. Said legs 28 of said strip of metal included as a part of the combined contact entity and armature 26 are secured to the blade or member 22 by a rivet passing through portions of the legs 28 which are adjacent the fold or bend 27, as well as through the free end portion 25 of said blade or member, and portions 29, 29 of said legs 28 which are at the side of the blade or member 22 adjacent the insulating base 15, or at the inner side of said blade or member, normally are in spaced apart relation to each other. The rivet which passes through the legs 28 and said blade or member 22 provides a contact element 30 at one side of the contact entity constituted as one end portion of the rivet and a contact element 31 at the opposite side of said contact entity constituted as the opposite end portion of said rivet. The normally spaced apart portions 29, 29 of the legs 28, 28 of the strip of metal of the combined contact entity and armature 26 constitute an armature for a magnet 32 of the thermostatic control device, which armature is adapted to be adjusted as to width by the setting of said portions 29, 29 closer together or farther apart.

The magnet 32 as illustrated is of annular or disc configuration, and desirably may be an aluminum-nickel alloy, or other suitable material. As shown, said magnet 32 includes a flat inner or rear surface 33 thereof which is seated against the adjacent or outer or forward surface of the insulating base 15, and a rivet 34 is welded to said surface 33, passes through an opening in said insulating base and is upset, as at 35, into a concavity and back of an annular shoulder 36 of the insulating base to retain the magnet in fixed, rigid relation to said insulating base. Said magnet 32 includes a flat outer or front surface 37 thereof having a groove or slot 38 therein. Said groove or slot 38 extends the full distance across the outer or front surface 37 of the magnet 32 and provides spaced apart poles 39, 39 of said magnet which extend longitudinally of the insulating base 15 and are parallel with the normally spaced apart portions 29, 29 which constitute the adjustable armature of the control device. More explicitly, the portions 29, 29 of the adjustable armature are closer together than are the poles 39, 39 of the magnet 32, and the innermost or rearmost margins or edges of said portions 29, 29 lie between said poles 39, 39, in slightly spaced relation to the base of the groove or slot 38, more or less as disclosed in Fig. 7.

A protector or shield, as from dust, dirt, etc., of the control device is designated 40. As shown, said protector or shield 40 is composed of insulating material, such as mica, and is constituted as a part-circular, hollow shell open, as at 41, at one of its sides, its lower side as illustrated. One end portion 42, the inner or rear end portion as disclosed, of the protector, shield, or part-circular, hollow shell 40 snugly is seated between the circumference or perimeter of the magnet 32 at the inner side of said protector, shield or shell and arc-shape flanges 43 upon the adjacent surface of the insulating base 15 at the outer side of said protector, shield or shell. The protector or shield 40 extends outwardly or forwardly for some considerable distance from the insulating base 15, the free end portion 25 of the bi-metallic blade or thermostatically responsive member 22 extends freely through the opening 41 in the part-circular, hollow shell which constitutes said protector or shield, and the combined contact entity and armature 26, including the contact elements 30 and 31 and the adjustable armature portions 29, 29, completely are situated within the interior of said part-circular, hollow shell in spaced relation to its wall.

Conducting members, represented 44 and 45, respectively, are mounted, as at 46, upon the outer or forward surface of the insulating base 15 at opposite sides of the protector or shield 40, and each of said conducting members 44 and 45 includes an outwardly or forwardly extending split lug, denoted 47 and 48, respectively. The split lug 47 adjustably supports a terminal screw 49 adapted to be engaged by the contact element 30, and the split lug 48 adjustably supports a terminal screw 50 adapted to be engaged by the contact element 31. Said terminal screws 49 and 50 are disposed perpendicularly to the legs 28, 28 of the strip of metal included as a part of the combined contact entity and armature 26, and the terminal screws are adapted to be adjusted in direction toward and away from the contact elements 30 and 31, respectively. The wall of the protector or shield 40 includes diametrically opposed openings 51 through which the terminal screws 49 and 50 freely pass, and the split lugs 47 and 48 are disposed between the arc-shape flanges 43 upon the insulating base 15, in contiguous relation to the outer surface of said protector or shield at and adjacent to said openings 51.

The screws 46 which secure the conducting members 44 and 45 upon the outer or forward surface of the insulating base 15 pass through said insulating base and secure conducting members, denoted 52 and 53, respectively, upon the inner or rearward surface of the insulating base. The conducting member 52 supports a binding post 54 and the conducting member 53 supports a binding post 55.

The inner or rearward end of the stud 20 fixedly carries a conducting member 56 which is situated upon the inner or rearward surface of said insulating base 15, and said conducting member 56 supports a binding post 57.

The control device of the invention is for the purpose of assisting or cooperating in the regulation of a device which requires motive power to effect its operation. In response to flexing of the bi-metallic blade or thermostatically responsive member 22 the contact element 30 sometimes will engage the terminal screw 49 and sometimes will be disengaged from this screw, thus to control a corresponding circuit, and the contact element 31 sometimes will engage the terminal screw 50 and sometimes will be disengaged from this screw, thus to control a corresponding circuit. That is, the bi-metallic blade or thermostatically responsive member 22 is adapted to be actuated in response to temperature changes to make and break a circuit including the contact element 30 and the terminal screw 49 and to make and break a circuit including the contact element 31 and the terminal screw 50.

The element or arm 17 is adjustable so that a circuit including said contact element 30 and said terminal screw 49 and a circuit including said contact element 31 and said terminal screw 50 can be made and broken when the bi-metallic blade or thermostatically responsive member is subjected to any temperature, within limits, which may be selected. More explicitly, the outer or upper side or edge of the enlarged portion 19 of said element or arm 17 includes a rack 58 which meshes with a pinion 59 perpendicular to, centrally supported by and normally rigid with a dial 60. The dial 60 includes a hub or spindle 61 thereof which is rotatably mounted, as at 62, in the insulating base 15. The outer or forward surface of said dial 60 is calibrated, as at 63, in degrees of temperature. Evidently, by rotation of the dial, the element or arm 17 will be swung upon its axis 20 in direction to correspond and the combined contact entity and armature 26, including the contact elements 30 and 31 and the adjustable armature portions 29, 29, will be swung toward right or left, as the case may be, so that said contact elements 30 and 31 will be closer to or farther from the terminal screws 49 and 50, respectively.

A guard plate 64 is disposed centrally across the dial 60, in clearing relation to the pinion 59, and the opposite end portions of said guard plate are secured down against the insulating base, as by screws 65. The guard plate 64 is in proximate or contiguous relation to the outer or forward surface of the dial 60, and includes a pointer 66 for reference to the calibrations 63 upon said dial. Evidently, the guard plate 64 is protection for the dial 60, and also serves to insure that the hub or spindle 61 upon said dial always will remain properly inserted in the bearing 62 for said hub or spindle.

The pinion 59, while normally rigid with the dial 60, is mounted in said dial so that said pinion and dial can be rotated relatively to each other when this may be desirable, as during manufacture of the control device, or at other time, to alter a set position of said pinion along the length of the rack 58, thus to alter a set position of the element or arm 17 and the bi-metallic blade or thermostatically responsive element 22 with reference to the calibrations 63 on the dial 60, as will be understood. More explicitly, the pinion 59 integrally carries a split reduced portion or extension 67 which normally is frictionally retained in an opening 68 through the dial 60 and its hub or spindle 61 to preclude relative turning movement of said pinion and dial. The construction and arrangement is such, however, that by forcible turning movement of the pinion and dial relatively to each other the pinion can be rotated to any adjusted position on or in the dial which may be selected.

Means which may be employed to fasten the dial 60 in fixed position upon the insulating base 15 while the pinion 59 is being forcibly rotated in said dial consists, in the disclosure as made, of a locking lug 69 secured to said insulating base by a screw 70 and including a portion of said locking lug adapted to be fastened down against the outer or front surface of the dial by turning the screw home in the insulating base. Obviously, the locking lug 69 can be employed releasably to fasten the dial 60 in fixed relation to the insulating base whether or not the pinion 59 is to be rotated relatively to said dial.

In practice, the dial 60 should be permitted turning movement which is less than 360 degrees in extent. Otherwise, the control device easily could be put out of proper adjustment, as will be evident. In the illustrated embodiment of the invention, said dial 60 is intended to have overall rotational movement which at most is not much greater than 180 degrees, and, in order that the dial cannot be turned beyond this mentioned extent, the outer or forward surface of the insulating base 15 is provided with a part-circular groove or slot 71 having closed ends and said dial includes a limit pin or lug 72 upon the inner or rearward surface of the dial ridable in said groove or slot 71.

It is necessary, in order that the thermostatic control device may function with precision, that sidewise or lateral swinging adjustment of the element or arm 17 by rotational movement of the dial 60 be accurately made, thus accurately to set the bi-metallic blade or thermostatically responsive member 22 and the contact elements 30 and 31 carried by said blade or member relatively to the terminal screws 49 and 50. Stated otherwise, if the element or arm 17 and the bi-metallic blade or thermostatically responsive member 22 are to be adjustably set at accurate location, it is necessary that there be no freedom for relative movement, or play, between the dial 60 and said element or arm 17, such as ordinarily can exist between the teeth of a rack, such as 58, and the teeth of a pinion, such as 59. To the end that there will be no play or slack between the rack 58 and the pinion 59, a tension coil spring 73 is included in the structure. More explicitly, the tension coil spring 73 is mounted upon the insulating base 15 in surrounding relation to the stud 20, between the curvilinear end portion 18 of the element or arm 17 and the adjacent or outer or forward surface of said insulating base. As illustrated, said just mentioned surface of the insulating base includes a substantially annular concavity 74 in which said tension coil spring freely is situated. An end portion 75 of the tension coil spring is disposed against a shoulder 76 at a side of said annular concavity 74 and the opposite end portion of said tension coil spring includes an outwardly or forwardly extending hook portion 77 which is fastened in said curvilinear end portion 18 of said element or arm 17. The construction and arrangement is such that the tension coil spring 73 causes the rack 58 and its teeth to be resiliently urged laterally or sidewise of the insulating base 15 thus to cause a tooth of said rack always to be in pressing engagement with a tooth of the pinion 59 in lateral or sidewise direction of said insulating base. In the disclosure as made, the tension coil spring 73 urges the element or arm 17 and the rack 58 thereon toward the right as disclosed in Fig. 5, so that for any adjusted or set position of the dial 60 the element or arm will have a single adjusted or set position to correspond, at which adjusted or set position of said dial a right side surface of a tooth of the rack 58 will be in resilient engagement with a left side surface of a tooth of the pinion 59, as will be understood. Of course, the coil spring 73 will have potential of insufficient magnitude to cause the pinion 59 to be rotated by the rack 58 under tension exerted by said coil spring. That is, the tension coil spring 73 will be too weak to be capable of causing the dial 60 to be rotated in its bearing.

A removable cover member for the insulating base and operative parts of the control device is represented generally at 78. Said cover member is constituted as a rectilinear shell including an outer or forward wall 79, opposite side walls 80, a top wall 81 and a bottom wall 82. The inner or rearward side of the cover member 78 is open as indicated at 83.

The outer or forward wall 79 of the cover member 78 includes an outwardly or forwardly offset central portion 84 thereof provided by spaced apart, right-angularly bent portions 85 of said outer or forward wall 79, and said portions 84 and 85 in turn provide a pocket 86 of said cover member 78 for the ready reception of a thermometer bulb 87 with mercury therein, customarily forming a visible part of a control device of the present general character. The thermometer bulb 87 is conveniently supported, as at 108, upon a retaining slab 88 for said thermometer bulb to lie within the pocket 86 and extend longitudinally of the cover member 78. Said retaining slab 88 is adapted additionally to constitute means for closing or covering the outer or forward end of the protector or shield 40 when said cover member 78 is in proper position upon the remainder of the control device. As shown more clearly in Fig. 7, the retaining slab 88 is removably mounted in fixed, parallel, spaced relation to the offset central portion 84 of the outer or forward wall 79 of the cover member through the instrumentality of spaced apart screws 89. More explicitly, the heads of the screws 89 are welded, or otherwise secured, as at 90, to the inner or rearward surface of the offset central portion 84 in such manner that said screws are perpendicular to said offset central portion, and the retaining slab 88 includes spaced apart openings 91 which receive the end portions of the screws spaced from the outer or forward wall 79. Nuts 92 upon the free ends of the screws 89 and against inner or rear surfaces of the retaining slab 88 cause said retaining slab to be fastened in fixed relation to the cover member. As disclosed, there is a screw 89 at either side of the thermometer bulb 87, in spaced relation to said thermometer bulb. A longitudinal slot 93 disposed centrally of the central portion 84 of the outer or forward wall 79 of the cover member is for rendering the thermometer bulb visible through said cover member, and said outer or forward wall 79 is calibrated, as at 94, in degrees to be read with reference to mercury in said thermometer bulb. That is, the thermometer bulb with mercury and the calibrations 94 together provide a thermometer.

The opposite side walls 80 of the cover member 78 are closed. The top wall 81 includes an elongated opening 95 for reception of an upwardly projecting portion of the dial 60, and said top wall includes additional openings 96 for permitting free passage of air into the interior of the cover member, between said cover member and the insulating base 15. Also, the bottom wall 82 includes an enlarged opening 97 for circulation of air through the control device.

The end portion of the insulating base 15 adjacent the dial 60, the upper end portion of said insulating base as disclosed, includes outwardly or upwardly extending, spaced apart protuberances 98 adapted to be received in spaced apart openings 99 in the top wall 81 of the cover member 78 when placed upon the insulating base in housing relation to other parts of the control device, and the end portion of said insulating base adjacent the stud 20, the lower end portion of the insulating base as disclosed, includes an outwardly or downwardly extending screw retainer 100 adapted to be received in a shaped slot 101 in the inner or rear side edge of the bottom wall 82 of said cover member when placed upon said insulating base. The construction and arrangement is such that the open side 83 of the cover member 78 terminates flush with the inner or rearward surface of the insulating base 15 when said cover member is mounted upon the remainder of the control device. A vertical passageway 102 in the end portion of the insulating base having the screw retainer 100 is for the reception of lead wires for the control device, and the shaped slot 101 includes a portion thereof which provides clearance for said lead wires. Of course, the open side 83 of the cover member 78 has dimensions nicely to fit upon and about the top, bottom and side marginal portions or edges of the insulating base 15, as shown very clearly in Figs. 4, 6 and 7.

It will be evident that the armature, including the normally spaced apart portions 29, 29, for the magnet 32, is adjustable as to width, so that said portions 29, 29 individually can be set at any adjusted positions relatively to the spaced apart poles 39, 39 of said magnet which in a particular instance may be selected. By movement apart of the armature portions 29, 29 these will be adjusted closer to the magnet poles 39, 39, and vice versa.

Also it will be evident that when the cover member 78 is applied to the remainder of the control device, in the manner as before set forth, the magnet 32 and its spaced apart poles 39, 39, the portions of the terminal screws 49 and 50 within the protector or shield 40, and the combined contact entity and armature 26, including the contact elements 30 and 31 and the normally spaced apart armature portions 29, 29 of said combined contact entity and armature, all will be protected from dust, dirt, etc. That is, these mentioned elements will be surrounded, by the protector or shield 40, the insulating base 15 and the retaining slab 88, save at the open lower side 41 of said protector or shield. Evidently, dust, dirt, etc., are not at all liable to enter the interior of the protector or shield 40 through its open lower side. At the same time, the interior of said protector or shield is wide open so that atmospheric air readily can circulate within the protector or shield.

In Fig. 10 there is disclosed a thermostatic control device which may be employed in a two wire electrical system, instead of in a three wire electrical system as illustrated and set forth in connection with Figs. 1 to 9. The control device of Fig. 10 in all respects may be similar to the control device already described, except that the bi-metallic blade or thermostatically responsive member 22' desirably will support a resilient arm 103 which in turn will support a contact element 30' for engagement with a terminal screw 49', as well as support an armature 104, including normally spaced apart armature portions such as 29, 29 of said armature, for the magnet, and the terminal screw 50 of Figs. 2, 5, 6 and 7 will be replaced by a mechanical stop 105 which will be mounted and disposed in the protector or shield in about the manner as set forth in connection with said terminal screw 50. In the instance of the disclosure of Fig. 10, the mechanical stop 105 will be dead; that is, not energized; and merely will serve to limit the movement of the bi-metallic blade or thermostatically responsive member 22' and the armature 104 in direction toward the right in said Fig. 10. The contact element 30' upon the resilient arm 103 normally will be in spaced relation to the bi-metallic blade or thermostatically responsive member 22', and swinging movement of said resilient arm in direction away from said bi-metallic blade or thermostatically responsive member will be limited by a hook 106 upon the armature 104. The resilient arm 103 is a common element of an ordinary snap action switch. The control device of Fig. 10 will function in about the manner as set forth in connection with the disclosure of Figs. 1 to 9, except that the resilient arm 103, carrying the contact element 30', and the bi-metallic blade or thermostatically responsive member 22' will be capable of limited movement relatively to each other, and the mechanical stop 105 will serve merely as means for limiting the extent of movement of said bi-metallic blade or thermostatically responsive member 22', and, hence, of said resilient arm 103, in direction away from the terminal screw 49'. The two wire electrical system contemplated according to the disclosure of Fig. 10 of course will include a lead wire (not shown) extending to the terminal screw 49' and a lead wire (not shown) extending to the bi-metallic blade or thermostatically responsive member 22', which said lead wires will be adapted to be connected in a circuit for controlling or regulating a device requiring motive power to effect its operation.

In Figs. 11 and 12 there is shown a fragment of a bi-metallic blade or thermostatically responsive member 22a having thereon a combined contact entity and armature 26a, including legs 28a, 28a with normally spaced apart armature portions 29a, 29a and contact elements 30a and 31a of said combined contact entity and armature, about as illustrated and described in connection with the disclosure of Figs. 1 to 9. In addition, there is shown in Figs. 11 and 12 a taper screw 107 through the instrumentality of which the width of said armature, including the normally spaced apart armature portions 29a, 29a, can be adjusted. More explicitly, the taper screw 107 is situated between the armature portions 29a, 29a in adjacent relation to the bi-metallic blade or thermostatically responsive member 22a, and said armature portions 29a, 29a have potential, or resilient tendency, to move in direction toward each other. Obviously, in response to turning movement of the taper screw 107 causing this to move in direction away from the armature portions 29a, 29a, or outwardly, said armature portions, by reason of their potential, or resilient tendency, will move toward each other to cause the adjustable armature to be narrowed, and in response to turning movement of said taper screw causing this to move in direction toward said armature portions, or inwardly, the armature portions will be forced apart by the taper screw to cause said adjustable armature to be widened. The armature portions 29a, 29a evidently will be moved in direction toward the spaced apart poles, respectively, of the magnet, such as 32, when the adjustable armature is widened, and in direction away from said spaced apart poles, respectively, when said adjustable armature is narrowed.

In any installation of a thermostatic control device made according to the invention, the make and break of the circuit at the terminals 30—49, 31—50 and/or 30'—49' will be by snap action caused by magnetic attraction between each armature portion 29, 29, or 29a, 29a, and the magnetic pole, such as 39, 39, adjacent said armature portion. That is to say, the terminals 30—49, 31—50 and 30'—49', will be made to engage and disengage in snap action fashion by positive and quick magnetic action exerted by each pole, such as 39, of the magnet, such as 32, upon the corresponding armature portion, such as 29, 29 or 29a, 29a, in a manner which will be understood.

In the instance of the three wire electrical system as in Figs. 1 to 9, and as in Figs. 11 and 12, either the terminals 30—49 or the terminals 31—50 always will be in engagement, except during snap action movement of the combined contact entity and armature. In the instance of the two wire electrical system as in Fig. 10, either the terminals 30'—49' or the armature and the mechanical stop 105 always will be in engagement, except during snap action movement of the combined contact entity and armature.

What is claimed is:

1. In a thermostatic control device, spaced apart magnetic poles, a thermostatically responsive member, and an armature adapted to be adjusted as to width supported by said thermostatically responsive member and disposed between said magnetic poles.

2. In a thermostatic control device, spaced apart magnetic poles, a thermostatically responsive member, an armature supported by said thermostatically responsive member and disposed between said magnetic poles, and means for adjusting the width of said armature.

3. In a thermostatic control device, a magnet including spaced apart magnetic poles, and an armature adapted to be adjusted as to width disposed between said magnetic poles.

4. In a thermostatic control device, spaced apart magnetic poles, a thermostatically responsive member, and an armature supported by said thermostatically responsive member and including normally spaced apart portions of said armature disposed between said magnetic poles, said armature portions being adapted to be adjusted in direction toward each other and away from said magnetic poles, respectively, and in direction away from each other and toward said magnetic poles, respectively.

5. In a thermostatic control device, spaced apart magnetic poles, a thermostatically responsive member, and an armature supported by said thermostatically responsive member constituted as a strip of metal bent upon itself and including normally spaced apart armature portions of said strip of metal disposed between said magnetic poles, said armature portions being adapted to be adjusted in direction toward each other and away from said magnetic poles, respectively, to decrease the width of said armature and in direction away from each other and toward said magnetic poles, respectively, to increase the width of said armature.

6. In a thermostatic control device, spaced apart magnetic poles, a terminal conductor adjacent one of said magnetic poles, a thermostatically responsive member, and a combined contact entity and armature supported upon said thermostatically responsive member including a contact element of said combined contact entity and armature adapted removably to engage said terminal conductor and normally spaced apart armature portions of said combined contact entity and armature adapted to be adjusted as to width disposed between said magnetic poles.

7. In a thermostatic control device, spaced apart magnetic poles, spaced apart terminal conductors adjacent said magnetic poles, respectively, a thermostatically responsive member, and a combined contact entity and armature supported by said thermostatically responsive member including contact elements of said combined contact entity and armature movable between said terminal conductors and normally spaced apart armature portions of said combined contact entity and armature disposed between said magnetic poles, said armature portions being adapted to be adjusted in direction toward each other and away from said magnetic poles, respectively, and in direction away from each other and toward said magnetic poles, respectively.

8. In a thermostatic control device, spaced apart magnetic poles, a terminal conductor adjacent one of said magnetic poles, a stop adjacent another of said magnetic poles and in spaced relation to said terminal conductor, a thermostatically rsponsive member, and a combined contact entity and armature supported by said thermostatically responsive member including a contact element of said combined contact entity and armature adjacent and adapted removably to engage said terminal conductor, a portion of said combined contact entity and armature at the side of said contact element opposite said terminal conductor and disposed between the contact element and said stop and adapted removably to engage said stop, and normally spaced apart armature portions of said combined contact entity and armature disposed between said magnetic poles, said armature portions being adapted to be adjusted in direction toward each other and away from said magnetic poles, respectively, and in direction away from each other and toward said magnetic poles, respectively.

9. In a thermostatic control device, spaced apart magnetic poles, a terminal conductor adjacent one of said magnetic poles, a thermostatically responsive member, an armature and a contact element upon said thermostatically responsive member, said armature including a portion thereof disposed between said magnetic poles and said contact element being adapted removably to engage said terminal conductor, and a protector in surrounding relation to said magnetic poles, said armature, said contact element and said terminal conductor, said protector including an open lower portion thereof through which said thermostatically responsive element freely passes.

10. In a thermostatic control device, spaced apart magnetic poles, a terminal conductor adjacent one of said magnetic poles, a thermostatically responsive member, an armature and a contact element supported by said thermostatically responsive member, said armature including a portion thereof disposed between said magnetic poles and said contact element being adapted removably to engage said terminal conductor, a protector in surrounding relation to said magnetic poles, said armature, said contact element and said terminal conductor and including an open lower portion of said protector in which a part of said thermostatically responsive member freely is arranged, and means closing the opposite end portions of said protector.

11. In a thermostatic control device, an insulating base, a magnet secured upon said insulating base and including spaced apart magnetic poles, a thermostatically responsive member, an armature supported by said thermostatically responsive member and disposed between said magnetic poles, a tube-like protector in surrounding relation to said magnet and said armature including open end portions and an open lower side of said tube-like protector through which a part of said thermostatically responsive member freely passes, a thermometer bulb in spaced relation to said insulating base, and a member supporting said thermometer bulb, said insulating base and said member being in closing relation to said open end portions of said tube-like protector.

12. In a thermostatic control device, an insulating base, an element, means supporting said element upon said insulating base for turning movement, a thermostatically responsive member supported by said element, a dial rotatably mounted upon said insulating base, a pinion fixed to rotate with said dial, a rack upon said element and in mesh with said pinion, and means normally resiliently urging said element toward turning movement upon said insulating base imparting potential to said rack in direction longitudinally of the rack and tangentially of the pinion.

13. In a thermostatic control device, an insulating base, a thermostatically responsive member mounted to have movement upon said insulating base, a dial rotatably mounted upon said insulating base, a pinion, frictional means securing said pinion to said dial to rotate with the dial, and means actuated by said pinion in response to rotation of said dial adapted to cause said thermostatically responsive member to be moved upon said insulating base, said frictional means securing said pinion to said dial being adapted to permit rotative adjustment of the dial and the pinion relatively to each other when this is intentional.

14. In a thermostatic control device, an insulating base, a thermostatically responsive member mounted to have movement upon said insulating base, a dial rotatably mounted upon said insulating base and including an opening of the dial arranged axially thereof, a pinion, an element disposed axially of said pinion and frictionally retained within said opening normally to cause said pinion to rotate with the dial when said dial is rotated, said element being adapted to be rotatably adjusted in said opening when this is intentional, and means actuated by said pinion in response to rotation of said dial adapted to cause said thermostatically responsive member to be moved upon said insulating base.

15. In a thermostatic control device, an insulating base including a bearing, a dial adjacent said insulating base and rotatably mounted in said bearing, said insulating base and dial, respectively, incorporatting complemental means adapted to limit the extent to which said dial can be rotated, and a member secured to said insulating base and retaining said dial in said bearing.

16. In a thermostatic control device, spaced apart magnetic poles, a thermostatically responsive member, and an armature supported by said thermostatically responsive member and including portions of said armature adjustable toward and away from each other disposed between said magnetic poles, said armature portions being adapted to be adjusted in direction toward each other and away from said magnetic poles, respectively, and in direction away from each other and toward said magnetic poles, respectively.

17. In a thermostatic control device, spaced apart magnetic poles, a thermostatically responsive member, and an armature supported by said thermostatically responsive member and including portions of said armature disposed adjacent said magnetic poles and adapted to be adjusted toward and away from each other and toward and away from said magnetic poles.

18. In a thermostatic control device, spaced apart magnetic poles, a terminal conductor, a thermostatically responsive member, an armature and a contact element actuatable with said thermostatically responsive member, said armature including a portion thereof disposed adjacent said magnetic poles and said contact element being adapted removably to engage said terminal conductor, a protector in surrounding relation to said magnetic poles, said armature, said contact element and said terminal conductor, and a removable cover for said protector and thermostatically responsive member.

19. In a thermostatic control device, an insulating base, spaced apart magnetic poles secured upon said insulating base, a terminal conductor, a thermostatically responsive member, an armature and a contact element actuatable with said thermostatically responsive member, said armature including a portion thereof disposed adjacent said magnetic poles and said contact element being adapted removably to engage said terminal conductor, and a tube-like protector in surrounding relation to said magnetic poles, said armature, said contact element and said terminal conductor.

20. In a thermostatic control device, an insulating base, spaced apart magnetic poles secured upon said insulating base, a terminal conductor, a thermostatically responsive member, an armature and a contact element actuatable with said thermostatically responsive member, said armature including a portion thereof disposed adjacent said magnetic poles and said contact element being adapted removably to engage said terminal conductor, and a tube-like protector in surrounding relation to said magnetic poles, said armature, said contact element and said terminal conductor and including open end portions and an open lower side of said tube-like protector through which said thermostatically responsive member freely passes, and a cover member for said insulating base, said cover member and insulating base being in closing relation to said open end portions of said tube-like protector.

21. In a thermostatic control device, a base, an element, means supporting said element upon said base for turning movement, a thermostatically responsive member supported by said element, a pinion rotatably mounted upon said base, a rack upon said element and in mesh with said pinion, and means normally resiliently urging said element toward turning movement upon said base imparting potential to said rack in direction longitudinally of the rack and tangentially of the pinion.

22. In a device of the character described, spaced apart magnetic poles, and an armature including portions adapted to be adjusted in direction toward each other and away from said magnetic poles and in direction away from each other and toward said magnetic poles, said armature being supported adjacent said magnetic poles.

23. In a device of the character described, spaced apart magnetic poles, an armature including portions adapted to be adjusted relatively to each other to alter the width of said armature, and means supporting said portions adjacent said magnetic poles.

24. In a device of the character described, spaced apart magnetic poles, an armature including portions adapted to be adjusted toward each other and away from said magnetic poles and away from each other and toward said magnetic poles, and means supporting said portions adjacent said magnetic poles.

25. In a thermostatic control device, spaced apart magnetic poles, a thermostatically responsive member, an armature supported by said thermostatically responsive member including a portion of said armature disposed adjacent said magnetic poles, a protector in surrounding relation to said magnetic poles and said armature including an open lower portion of said protector through which said thermostatically responsive member freely passes, and a removable cover for said protector and thermostatically responsive member.

26. In a thermostatic control device, an insulating base, a magnet secured upon said insulating base and including spaced apart magnetic poles, a thermostatically responsive member, an armature supported by said thermostatically responsive member and disposed adjacent said magnetic poles, a protector supported by said insulating base in surrounding relation to said magnet and said armature, said protector including an open lower portion thereof in which a part of said thermostatically responsive member freely is arranged, and a removable cover for said protector and thermostatically responsive member.

27. The combination as specified in claim 24, and a removable cover for said protector and said thermostatically responsive member.

28. In a thermostatic control device, a base, an element, means supporting said element upon said base for turning movement, a thermostatically responsive member supported by said element, a pinion rotatably mounted upon said base, a rack upon said element and in mesh with said pinion, and means normally resiliently urging said element toward turning movement upon said base and said rack in direction longitudinally of the rack and tangentially of the pinion.

EVERETT H. WHITE.